June 7, 1927.  S. F. SWOOPE  1,631,346

REPAIR LINK

Filed Feb. 12, 1925

Samuel Franklin Swoope

*INVENTOR*

Patented June 7, 1927.

1,631,346

UNITED STATES PATENT OFFICE.

SAMUEL FRANKLIN SWOOPE, OF CINCINNATI, OHIO.

REPAIR LINK.

Application filed February 12, 1925. Serial No. 8,843.

This invention relates to improvements in repair coupling links for chains and its primary object is to provide a link for coupling the ends of broken cross or tread chains of anti-skid chains.

A further object is to provide a repair link for cross chains that can be expeditiously hooked with the adjacent ends of a broken cross chain without the necessity of bending the ends of the repair link into contacting engagement or otherwise, the ends being formed with means to prevent displacement of the link before and after the same has been put into use.

Another object is to provide a link for cross chains of non-skid chains that may form a permanent part of the cross chain and is provided with a great wear resisting surface which is necessary for links of this character.

A further object is to provide a cross chain repair link that assumes a slight different shape after use upon a tire, and such use bends the ends of the links in close association to prevent the link from being casually displaced from its operative position.

This invention also consists in certain other features of construction and in the combination and arrangement of the several parts, to be hereinafter fully described, illustrated in the accompanying drawings and specifically pointed out in the appended claims.

Figure 1:
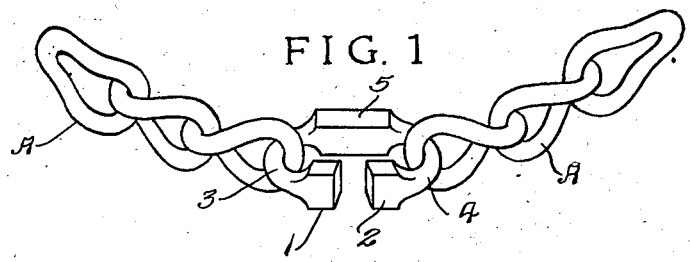
Figure 2:
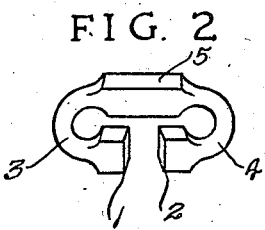
Figure 3:
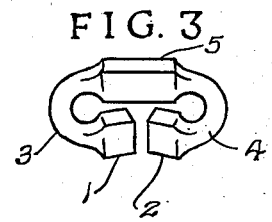
Figure 4:
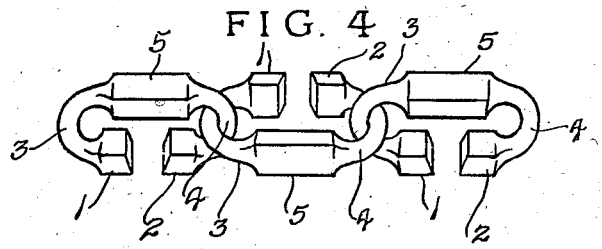

In describing my invention in detail, reference will be had to the accompanying drawings wherein like characters denote like or corresponding parts throughout the several views, and in which:

Figure 1 is a perspective view showing a conventional cross chain of an anti-skid chain with the central link removed and my novel link in the place thereof, Figure 2 is a similar view of my novel link per se, Figure 3 is a similar view showing the shape of the link as shown in Figure 2 after the same has been in use upon a tire, Figure 4 is a similar view of a plurality of links as shown in Figure 2 to illustrate their cooperative association if more than one link is necessary in repairing a chain.

Referring to the drawings in detail the letter A indicates the portions of a conventional cross chain for an anti-skid chain for vehicle wheels, the outer ends of said chain being adapted to be secured to the circumferential chain sections of the anti-skid chain and received in the adjacent links of the cross chain is the repair link which forms the subject matter of the present invention.

The repair link is formed from a single length of material bent to provide spaced ends 1 and 2 enlarged to provide a square formation which merges into the rounded in cross section portions to form the receiving arms 3 and 4 as shown in Figure 1 of the drawings.

The arms 3 and 4 have integrally formed therewith an elongated enlarged body 5 which is also square in cross section and merges into the arms as shown. This enlarged body 5 together with the enlarged ends 1 and 2 provide the ground engaging portions of the link and which as shown are extremely substantial for this purpose, it being of course apparent that it depends upon the manner in which the repair link is associated with the ends of the cross chain as to what side of the link engages the ground, but in any event the enlarged portions are adapted for this purpose.

As shown in Figure 3 the repair link has its ends 1 and 2 spaced slightly toward the body 5 and in close association with each other, this shape is caused after use of the link with a cross chain or an anti-skid chain upon a tire. The arms 3 and 4 being of less area in cross section than the remaining structure of the repair link, they yield to the pressure acting upon the link which results in immediately closing the gap and therefore prevent displacement of the link from its operative position as suggested in Figure 1.

Figure 4 discloses a plurality of links arranged in associated formation and which illustrates the manner of associating said links in case more than one link is necessary to repair the cross chain.

It is thought from the foregoing description that the advantages and novel features of my invention will be readily apparent.

I desire it to be understood that I may make changes in the construction and in the combination and arrangements of the several parts, provided that such changes fall within the scope of the appended claims.

I claim:

1. A repair link of the character described comprising an enlarged body portion provided with flat surfaces and having merging therefrom rounded in cross section arms adapted to receive the adjacent links of a cross chain of an anti-skid chain, and enlarged ends formed on the arms.

2. A repair link for cross chains of an anti-skid chain for vehicle wheel tires, comprising an enlarged body portion which is square in cross section and enlarged end portions also square in cross section and being arranged in spaced relation with respect to each other, arms connecting the enlarged body portion with the ends, and being adapted to be bent to place the ends in close association after use of the link.

SAMUEL FRANKLIN SWOOPE.